United States Patent [19]

Decker

[11] Patent Number: 4,986,026

[45] Date of Patent: Jan. 22, 1991

[54] ALTERNATIVE METHOD FOR PRODUCING TALL FESCUE SOD

[76] Inventor: Henry F. Decker, 4751 Stover Rd., Ostrander, Ohio 43061

[21] Appl. No.: 224,939

[22] Filed: Jul. 27, 1988

[51] Int. Cl.$^5$ .............................................. A01C 1/04
[52] U.S. Cl. ...................................................... 47/56
[58] Field of Search .................... 47/56, 9, 58; 106/93

[56] References Cited

U.S. PATENT DOCUMENTS

| | | | |
|---|---|---|---|
| 3,890,739 | 6/1975 | Blackburn | 47/56 |
| 4,225,359 | 9/1980 | Schneider | 106/241 |
| 4,716,679 | 1/1988 | Heard | 47/56 |
| 4,720,935 | 1/1988 | Rogers et al. | 47/56 |

FOREIGN PATENT DOCUMENTS 1126663 3/1962 Fed. Rep. of Germany .......... 47/56

OTHER PUBLICATIONS

Turf Management for Golf Courses, James B. Beard, 1982, p. 604, Table C-2, PTO Scientific Library.

*Primary Examiner*—David A. Scherbel
*Assistant Examiner*—Michele A. Van Patten
*Attorney, Agent, or Firm*—Isaac Angres

[57] ABSTRACT

A novel method is described for growing tall fescue sods on a solid base in large rolls. Whole culm straw is placed 1–2 inches deep over the solid base, typically plastic sheeting. Thirty to forty cubic yards of composted sewage sludge are then applied to the straw, filling the voids and interstices to produce a coherent matrix. This is seeded with tall fescue, then irrigated, fertilized, and mowed in a conventional manner. Unharvested wheat seed left in the straw germinates along with the tall fescue and forms a vigorous primary rooting system which rapidly effects a bona fide sod about one-half inch thick and aproximately one-half the weight of a conventional mineral sod. The synthetic sod is harvested in large rolls typically as much as five feet wide and comprising 20–50 square yards. These big rolls are laid at the installation site by the grading tractor, obviating the need for a fork lift, pallets, and laying crew as used in conventional sodding.

11 Claims, No Drawings

4,986,026

ALTERNATIVE METHOD FOR PRODUCING TALL FESCUE SOD

BACKGROUND OF THE INVENTION

The concept of growing grass sod over a solid or impermeable base such as concrete or plastic sheeting goes back, as far as I know, to experiments conducted by the O. M. Scott Co. in Marysville, Ohio, starting in the summer of 1965. Bluegrass sod was grown over concrete on the front yard of the publisher of the local newspaper. It was grown successfully this way for several years, widely publicized, and used in O. M. Scott Co. advertising.

I started experimenting with and expanding the concept shortly thereafter at nearby Ohio Wesleyan University and demonstrated very shortly that it had several attractive features and advantages compared to the conventional system of growing sod on soil. First, and probably foremost, my research indicated that if grass seed was germinated in a suitable medium placed over a solid or impermeable base, typically 1-6 mil polyethylene sheeting or film, and given optimum growing conditions, the turfgrasses would begin to grow in such a manner that the primary rooting system of the grasses would quickly bind the growing medium into a sod. The sod, complete with the young rooting system, could be peeled or rolled intact and coherent after only a few weeks off the plastic sheeting or impermeable base. Various types of nettings could also be inserted into the growing medium which, as in conventional sodding, enhanced even further the speed with which the sod would be ready to harvest.

The quick formation of the sod was an obvious advantage over the conventional system of producing sod on soil in which 1-2 years or even more are required before the sod is knitted sufficiently to remain coherent when harvested with a sod cutter.

Conventional sod on soil requires the formation of rhizomes, tillers, secondary roots, and stolons, and the intertwining of these growth processes which take a relatively lengthy amount of time to bind the grasses and soil into a sod. The extensive primary rooting system is essentially lost in conventional sod production since it goes deep into the soil and is of little or no consequence in the binding of the sod.

On the other hand by germinating the seed over a solid base such as plastic sheeting the primary rooting of the seedlings is trapped, so to speak; and since the primary rooting is quite extensive (one rye seedling has been reputed to produce 17 miles of roots) it runs along the solid base through the growing medium and quickly binds it into a sod in a matter of a few weeks.

The feature of using the primary rooting system of grasses to speed the formation of sod seemed at the time useful and valid, and I incorporated the research into a patent disclosure (#012097) in July of 1972 followed a year later by a patent application (Ser. No. 371,462). During the time, however, that the patent was being reviewed it became apparent that the methods did not translate well into the large scale type production demanded by the U.S. sod industry. I could not make the transition from the greenhouse bench, laboratory, or small plot to a field scale production. I subsequently abandoned the patent application as being premature, but I did publish my observations in the trade magazine, *Weeds, Trees, and Turf*. The methods as they existed at that time were simply not cost effective in competition with the U.S. sod industry which by the 1970's had become large in scale, efficient, and highly mechanized.

Other workers in Great Britain such as Goodall, Dawson, and Loads, faced similar difficulties and also the disadvantage that they were not familiar with the U.S. sod industry. All of their processes failed the test of practicality and cost effectiveness. As a result none of these inventions became commercially significant in the U.S. because of inherent problems that at the time were difficult or even impossible to solve. The problems are discussed below:

First, and probably the main problem, has been the availability of an inexpensive, yet plentiful growing medium. Hundreds of things appear to work in a greenhouse or small plot until one considers the weight, cost availability, ease of handling, trucking, spreading, and the expense to bring the growing medium up to nutritional minimums.

Second, the amount of growing material required to cover an acre sheet of plastic one inch deep translates into 134 cubic yards or over 20 single axle dump truck loads per acre! Quantities of rooting material of this dimension, their handling and manipulation, are obviously too expensive to be competitive with the conventional sod on soil process.

Third, placing an exact amount of growing material (such as one-fourth inch as proposed by Loads) evenly over acres of plastic film proved very difficult. While it worked "indoors" under controlled conditions in a greenhouse flat, it could not be readily obtained on a field scale. Furthermore, one-fourth inch of material outdoors was an insufficient amount of rooting material under the best conditions. Even one inch of material was not successful: it could not be spread or maintained evenly. A slight thunderstorm of the type prevalent in the Midwest would sheet erode the growing medium, washing it off the plastic film or other base, causing gaps that prevented continuous rooting and hence sod formation.

Fourth, some provision had to be made to eliminate or at least reduce the effect of thunderstorms or heavy rains on the early stages of the sod development. Any upsetting of the thin patina of growing material over the base produced gaps and distortions that prevented continuous rooting and hence sod formation.

Fifth, another important consideration is damping-off disease. Since the primary rooting of the seeding will functionally knit the sod (rather than the secondary rooting, rhizomes, stolons, tillers of conventional sod), the seeding rate is increased which in turn increases the incidence of damping-off. This devastating disease is expensive, often impossible, to control with fungicides.

Sixth, the use of foams, of containers as proposed by Dawson, or of curbs as proposed by Loads, or of burlap as proposed by Goodall, or of rolling up the plastic film to transport the grass as in Blackburn were all too expensive to be considered. The process had no validity whatsoever unless the plastic film could be used over and over again.

And finally seventh, conventional sodding is very labor intensive. Significantly reducing the amount of hard labor involved has to be a prime attribute of any alternative sodding system.

These major problems, then, had to be solved before any alternative sodding system could literally get off the ground. Starting in the 1982 season several things began to make an alternative sodding system more feasible. In essence it became possible to solve the problems.

First, around the country the Beltsville system of composting sewage sludge has begun to catch on. Suddenly, at least in Central Ohio, there is a readily available source of growing materials which in large quantities is being offered at an attractive price. This "Comtil", as is it called in Columbus, Ohio, was quickly determined to support the growth of turfgrasses without amendment. It was not only charged naturally with the right nutrients for grass culture, but it was also established that it retarded the development of damping-off and other fungal diseases! Problems No. 1 and 5 above then were solved in one step.

Next I made the important discovery that wheat straw could be used not only to protect the solid base from truck and tractor traffic but also to keep the growing medium in place in a thunderstorm. Furthermore, in the right condition, I discovered that the straw actually substituted for additional growing media, that is conferred some unidentified biological property in the mix that encouraged the growth of turfgrasses. Thus, the straw made it possible to drastically reduce the amount of expensive growing medium required to effect a sod. In addition it eliminated the problem of having to spread the medium on a solid base with a uniform thickness that was impossible to obtain. These new uses for straw were the most important discoveries made and effectively solved Problems No. 2, 3, and 4.

Another recent important development in the turf industry has made an alternative sod more feasible: this is the introduction of turf-type tall or coarse fescues. These new turf cultivars have several advantages over bluegrass: They are more drought, insect, and disease resistant. They are more durable on playing fields, and they germinate and root more quickly, more vigorously than bluegrass. On the other hand the tall fescues do not produce rhizomes and stolons and hence do not lend themselves to conventional sod production. In practice these drawbacks are compensated for by growing the sod for a longer than usual period, by laying sod netting, and by adding bluegrass to the tall fescue seeding. The netting, however, is expensive and difficult to use, and the bluegrass in time is much more aggressive than the tall fescue. Eventually it takes over the turf with the new lawn becoming heterogeneous and the tall fescue scattering into unsightly clumps.

These apparent disadvantages to growing a tall fescue sod in a conventional manner turn out to be strengths when tall fescue is considered as the main ingredient of an alternative sod grown on a solid base. The vigorous and rapid primary rooting gives the tall fescue cultivars a distinct advantage over the less vigorous bluegrass.

The tall fescue cultivars have one more subtle but very important advantage over other turfgrasses which I will explain: In the past it has been impossible to find wheat straw that was totally free of unharvested wheat seed. In the production of an alternative bluegrass sod this wheat seed would germinate much more quickly than bluegrass, obscure it, and retard its development. As well, wheat seedlings are much more coarse than fine turf premium bluegrasses and do not readily mow out; and then the new sod quickly becomes ragged, unattractive, and in fact unsaleable.

When tall fescue turf is grown, however, the wheat seed germinates at about the same speed. Furthermore the width and coarseness of the wheat blades is more comparable to that of the tall fescue when mowed close, and hence the new turf looks more uniform. As well the wheat also has a vigorous primary rooting system which aids the rapid development of the sod. Initially at least the annual wheat withstands close mowing even to an inch or less and acts in fact as a beautiful nurse crop.

Another advantage to the tall fescue/wheat seeding is that it germinates quickly, in a matter of days, and hence lends to the new sod a more rapid resistance to thunderstorms than when bluegrass constitutes the primary seeding.

Technically speaking, it is important to my alternative system to start not just with wheat "straw" but in fact with the whole culm including the inflorescence. Even a rotary combine will leave enough mature caryopses in the spikelets to benefit the early formation of the alternative tall fescue sod. No longer objectionable, the unharvested wheat seed is now desirable.

In summary, then, the tall fescue/wheat seeding germinates much more quickly than bluegrass; its coarse texture is homogeneous and not unattractive; and coupled with quick germination is a very rapid, extensive primary root growth. I have discovered that this tall fescue/wheat primary root growth is so vigorous that nettings, gels, absorbents, or any supplemental bluegrass seed is obviated. Furthermore, the new sod can be produced in much less time, at considerable savings in weight, than conventional tall fescue sod on soil.

The whole culms are spread about two inches deep over the solid base and now only 30-40 cubic yards of growing material/acre are required. This is spread over the straw and seeded conventionally. The rooting material fills the voids and interstices of the straw making a coherent, thunderstorm resistant, germinating matrix.

I discovered that in a few weeks the initial two inches of straw will compress and decompose into a mat or sod approximately one-half inch thick. The binding quality of the straw plus the external primary rooting system of the grasses combine to make a bona fide sod of high quality.

Harvesting the alternative sod has a distinct advantage over conventional sodding techniques. The sod is rolled up off the plastic base with the primary rooting intact rather than being cut off the soil by a sod cutter. Since it is slightly lighter and more tightly bound, it is possible to produce the sod in rolls much larger than conventional sod harvested by a Ryan or Brouwer sod cutter—even as wide as a truck bed with each roll comprised of 20-50 square yards. The rolls are loaded directly; no pallet is required. At the laying site the rolls are unloaded and installed by the grader and the raker obviating both a fork lift and a laying crew. This is a significant reduction in labor.

The solid base alternative sodding system is now competitive.

SUMMARY OF THE INVENTION

An alternative solid base accelerated method for producing tall fescue sod in big rolls is presented. The method does not require sod netting or bluegrass to knit the sod as in conventional tall fescue sod production. Furthermore the method produces a sod more quickly which is lighter in weight; it can be harvested, shipped, installed in large rolls that obviate the need for pallets, fork lifts, and a laying crew. The improved process can be done on a large scale and is competitive with conventional U.S. sod production.

The synthetic sod is produced by placing whole culm straw over a solid base such as 1-6 mil plastic sheeting and then applying 30-40 cubic yards per acre of composted sewage sludge to the straw. The relatively inexpensive straw substitutes for and reduces the quantity of expensive growing medium required. It also obviates the need for having to spread the growing medium to a uniform thickness that is difficult to obtain; and it protects the entire system from sheet erosion in a thunderstorm. The composted sludge/straw growing medium is now seeded with turf type tall fescue. Wheat seed that was left inadvertently in the whole culm straw will germinate along with the turfgrass after irrigation and will play a prominent role in knitting up the sod. The primary rooting systems of both the tall fescue and the wheat are very vigorous and very shortly bind the growing system into a coherent, bona fide sod, one-half inch or so thick, that can be harvested in large rolls. The solid base is left intact to be used again. Since the primary root system has been maintained and harvested intact, when the new sod is installed, it requires much less water to become established.

DESCRIPTION OF THE INVENTION

My research has led to the discovery of a vastly improved solid base, accelerated, alternative method for growing tall fescue sod in large rolls. The solid base can be provided by any surface that restricts root penetration but typically is 1-6 mil plastic sheeting or film unrolled over a graded bed of soil. The grading should be done so as to facilitate drainage.

Harvested whole culm wheat straw is then spread 1-2 inches over the solid base. I say whole culm because is it desirable to have at least some inflorescences left on the straw in order that some mature wheat caryopses will be placed in the seed bed. The reason for this will become apparent below.

The straw will act as a binder, filler, mulch, and most important, it was discovered, substitute partially as a growing medium for the new seeding. It will maintain the integrity of the growing system in a thunderstorm, and it will obviate the need to spread the subsequent growing medium at a uniform thickness that is difficult to obtain. Furthermore the straw will drastically reduce the amount of growing medium required in the next step.

A special growing medium is now spread over the 1-2 inches of straw at the rate of 30-40 yards/acre. It will fill the voids and interstices of the whole culm straw. This medium is composted municipal sewage sludge in our area called "Com-Til" which is rich nutritionally and will support turfgrass growth without amendment. It also provides resistance to damping-off disease, a very important consideration at high seeding rates.

Tall fescue seed is now spread evenly over the Com-Til/whole culm mix. To produce more primary rooting the seeding rate is raised slightly (to 8-10 lbs/1000 sq ft) over a typical tall fescue seeding—about 10 to 20 percent higher rate by weight. It is protected from damping off by the Com-Til.

The mix is now irrigated and grown essentially like any conventional grass sod. In a few days the wheat caryopses provided by the whole culms will germinate along with the tall fescue seed, and these two vigorous root producers will begin to effect a sod. As with conventional sod growing, standard fertilizers are added as needed; but few or no herbicides or pesticides are required. Mowing begins as soon as the grass is 1-2 inches high to encourage tillering.

In the production of conventional tall fescue sod, the harvester cuts off the primary root system. In order to knit the tiller type grass, then a rhizomatous bluegrass and sod netting are added at seeding time. On the other hand this synthetic sod is formed by the primary rooting systems, left intact, of the tall fescue and wheat. The sod is also formed more quickly, in at least half the time of a conventional sod. The primary rooting systems of the tall fescue and wheat are so vigorous that adding sod netting and rhizomatous bluegrass seed as in the production of conventional tall fescue sod are obviated.

After a few weeks the 1-2 inch layer of straw has compressed and decomposed into the growing medium into a mat or sod about one-half inch thick. This is now harvested in big rolls: cut five feet, more or less, wide into rolls comprising 20-50 square yards. It is important not to cut the base of plastic film since this will be left in place to be used over and over again. The big rolls are lifted onto a flat bed truck and transported to the installation site. On the basis of weight, the synthetic sod has been running about 50% lighter than one of our conventional mineral sods.

Further savings are obtained at the laying site where only the grading tractor is needed to unload and unroll the sod. One laborer, the hand raker, is helpful in positioning and cutting the sod rolls as needed. Those familiar with conventional U.S. sodding will immediately recognize that a fork lift, pallets, and a laying crew have been eliminated.

An indirect advantage is also conferred on the synthetic sod by the nature of the system: the primary root system has been harvested intact; and when the sod is laid on the new site, it requires much less water to become established in comparison to conventional sod, where most of the root system has been cut off in the harvesting and has to reform.

What is claimed is as follows:

1. A method for producing a tall fescue sod having substantially less weight than conventional sod in the absence of bluegrass or sod netting comprising:
    placing whole culm wheat straw to a depth range of one to two inches over a solid base; adding composted sludge in the range of 30-40 cubic yards per acre so as to fill the voids an interstices of the culms; seeding with suitable tall fescue cultivans; allowing both the unharvested wheat seed and tall fescue seed to germinate wherein a vigorous primary root growth systems of the tall fescue and wheat combine to knit the straw and growing medium into a sod of at least one-half inch thickness and then harvesting the resulting tall fescue sod.

2. The method of claim 1 wherein the whole culm straw partially substitutes for the growing medium.

3. The method of claim 1 wherein the whole straw protects the integrity of the growing medium.

4. The method of claim 1 wherein the straw allows for application of the growing medium to any desired non-uniform thickness.

5. The method of claim 1 wherein the straw protects the solid base.

6. The method of claim 1 wherein the straw decomposes after a sufficient growing period.

7. A tall fescue sod produced by the method of claim 1.

8. The tall fescue sod of claim 7 having approximately one-half the weight of conventional sod.

9. The method of claim 1 wherein the growing medium is resistant to damping off disease.

10. The method of claim 1 wherein the sod can be harvested in 5 foot wide large rolls.

11. The method of claim 1 wherein the solid base is plastic sheeting which can be conserved in place and reused for successive production.

* * * * *